(12) United States Patent
Lim et al.

(10) Patent No.: US 12,107,899 B1
(45) Date of Patent: Oct. 1, 2024

(54) TTP BASED AUTOMATED PLAYBOOK GENERATION METHOD AND SYSTEM PERFORMING THE SAME

(71) Applicant: KOREA INTERNET & SECURITY AGENCY, Naju-si (KR)

(72) Inventors: Joon Hyung Lim, Naju-si (KR); Tae Eun Kim, Naju-si (KR); Ki Jong Son, Naju-si (KR); Sae Woom Lee, Naju-si (KR); Seul Ki Choi, Naju-si (KR); Tae Hyeon Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 18/420,458

(22) Filed: Jan. 23, 2024

(30) Foreign Application Priority Data

Sep. 25, 2023 (KR) .................. 10-2023-0128228

(51) Int. Cl.
*H04L 9/40* (2022.01)
(52) U.S. Cl.
CPC .......... *H04L 63/20* (2013.01); *H04L 63/1425* (2013.01)
(58) Field of Classification Search
CPC ................ H04L 63/20; H04L 63/1425; H04L 63/1433; H04L 63/0227; H04L 63/0263; H04W 12/37
See application file for complete search history.

(56) References Cited

U.S. PATENT DOCUMENTS 9,179,007 B1 * 11/2015 Yadav .................. H04L 41/0893
9,800,615 B2 * 10/2017 Iyer ......................... H04L 63/20
(Continued)

FOREIGN PATENT DOCUMENTS

KR    10-2198104 B1    1/2021
KR    10-2419451 B1    7/2022
(Continued)

OTHER PUBLICATIONS

Kovacevic et al., "Systematic review of automatic translation of high-level security policy into firewall rules, " 2022 45th Jubilee International Convention on Information, Communication and Electronic Technology (MIPRO) Year: 2022 | Conference Paper | Publisher: IEEE.*
(Continued)

*Primary Examiner* — Roderick Tolentino
(74) *Attorney, Agent, or Firm* — Studebaker & Brackett PC (57) ABSTRACT

The method for automatically generating a playbook performed by a computing apparatus according to the present disclosure comprises periodically collecting asset information and CTI (Cyber Threat Intelligence) information of a target network, extracting TTP (Tactics, Techniques, Procedure) information using the collected asset information and the collected CTI information, retrieving a data source of the extracted TTP information, generating a temporary playbook including a data component matching a detection method of the extracted TTP information among a plurality of data components of the retrieved data source, verifying validity of the temporary playbook based on data component order information of the temporary playbook and determining whether rearrangement of data components included in the temporary playbook is needed, and rearranging data components included in the temporary playbook, and storing it as a final playbook.

16 Claims, 9 Drawing Sheets

(56) References Cited

U.S. PATENT DOCUMENTS

| | | | | |
|---|---|---|---|---|
| 12,003,546 B1* | 6/2024 | Quiros | ................ | H04L 63/1425 |
| 2014/0075494 A1* | 3/2014 | Fadida | ................ | G06F 9/45558 |
| | | | | 726/1 |
| 2018/0270200 A1* | 9/2018 | Byrne | ................ | H04L 63/0263 |
| 2019/0182287 A1* | 6/2019 | Hanley | ................... | H04L 63/20 |
| 2020/0177636 A1 | 6/2020 | Linn et al. | | |
| 2021/0406772 A1* | 12/2021 | Shillingford | .......... | G06F 40/169 |
| 2023/0300032 A1* | 9/2023 | Noel | ................... | H04L 41/0893 |
| | | | | 709/223 |
| 2024/0078004 A1* | 3/2024 | Qian | .................... | G06F 3/0482 |
| 2024/0106866 A1* | 3/2024 | Shyamala | ............... | H04L 63/20 |

FOREIGN PATENT DOCUMENTS

| | | | |
|---|---|---|---|
| KR | 10-2433831 B1 | 8/2022 | |
| KR | 10-2516819 B1 | 4/2023 | |

OTHER PUBLICATIONS

Rudolph et al., "A Framework for Generating User- and Domain-Tailored Security Policy Editors," 2016 IEEE 24th International Requirements Engineering Conference Workshops (REW) Year: 2016 | Conference Paper | Publisher: IEEE.*

* cited by examiner

| Initial Access | Execution | Persistence | Privilege Escalation | Defense Evasion | Credential Access | Discovery |
|---|---|---|---|---|---|---|
| Valid Accounts | Exploitation for Client Execution | Path Interception | Path Interception | Masquerading | OS Credential Dumping | Network Share Discovery |
| Default Accounts | Scheduled Task/Job | Boot or Logon Initialization Scripts | Boot or Logon Initialization Scripts | Rootkit | LSASS Memory | File and Directory Discovery |
| Domain Accounts | At (Linux) | Logon Script (Windows) | Logon Script (Windows) | Obfuscated Files or Information | Security Account Manager | System Information Discovery |
| | | | | ⋮ | ⋮ | ⋮ | ⋮ |

FIG. 5

Report Sentences of CTI

> APT39: An Iranian Cyber Espionage Group Focused on Personal Information January 29, 2019 Sarah Hawley, Ben Read, Cristiana Brafman-Kittner, Nalani Fraser, Andrew Thompson, Yuri Rozhansky, Sanaz Yashar in December 2018, FierEye identified APT39 as an Iranian cyber espionage group responsible for widespread theft of personal information.

We have tracked activity linked to this group since November 2014 in order to protect organizations from APT39 activity to date.

APT39's focus on the widespread theft of personal information sets it apart from other Iranian groups FireEye tracks, which have been linked to influence operations, disruptive attacks, and other threats.

APT39 likely focuses on personal information to support monitoring, tracking, or surveillance operations that serve Iran's national priorities, or potentially to create additional accesses and vectors to facilitate future campaigns.

...

Mappings

| TTP | Confidence |
|---|---|
| System Information Discovery | 78.9% |

TTP BASED AUTOMATED PLAYBOOK GENERATION METHOD AND SYSTEM PERFORMING THE SAME

CROSS-REFERENCE TO RELATED APPLICATION

This application claims the benefit of Korean Patent Application No. 10-2023-0128228, filed on Sep. 25, 2023, in the Korean Intellectual Property Office, the disclosure of which is incorporated herein by reference in its entirety.

BACKGROUND

1. Field

This disclosure relates to a method for automatically generating a playbook based on TTP (Tactics, Techniques, Procedure) and a system for performing the same, and this relates to a method for extracting TTP information based on external CTI (Cyber Threat Intelligence) information and internal network asset information, and automatically generating a playbook based on the extracted TTP information.

2. Description of the Related Art

The human resources required to analyze and respond to rapidly increasing security events is currently reaching its limit. Recently, security control centers are introducing SOAR (Security Orchestration, Automation, and Response) technology that automates analysis and response tasks through playbooks, but generating a playbook requires a lot of interview time about analysis and response procedures for each security event, and a lot of manpower is required. In addition, measures to respond to threats that have not yet occurred but may arise from outside are also required. Therefore, there is a need to automate playbook generation to reduce the human resources required for playbook generation and to expand human resources into the field of real-time response.

SUMMARY

The technical problem to be solved through this disclosure is to provide efficiency in work related to playbook generation to respond to new threats by automatically generating a playbook based on the results of extracting TTP information from CTI information.

According to some embodiments of the present disclosure, there is provided a method for automatically generating a playbook performed by a computing apparatus. The method comprises periodically collecting asset information and CTI (Cyber Threat Intelligence) information of a target network, extracting TTP (Tactics, Techniques, Procedure) information using the collected asset information and the collected CTI information, retrieving a data source of the extracted TTP information, generating a temporary playbook including a data component matching a detection method of the extracted TTP information among a plurality of data components of the retrieved data source, verifying validity of the temporary playbook based on data component order information of the temporary playbook and determining whether rearrangement of data components included in the temporary playbook is needed, and rearranging, when it is determined that rearrangement of the data components is needed, data components included in the temporary playbook according to an analysis result of the data component order information and storing it as a final playbook.

In some embodiments, extracting the TTP information using the collected asset information and the collected CTI information comprises determining whether the collected asset information or the collected CTI information has been updated, retrieving, when the collected asset information has been updated, intermediate TTP information related to a data source of the updated asset information, and retrieving CTI information including the intermediate TTP information related to the data source, retrieving, when the collected CTI information has been updated, the updated CTI information, and extracting the TTP information from the retrieved CTI information.

In some embodiments, extracting the TTP information from the retrieved CTI information comprises determining whether the retrieved CTI information is structured or unstructured, extracting, when the retrieved CTI information is structured, the TTP information using a rule-based parser, extracting, when the retrieved CTI information is unstructured, the TTP information using an artificial intelligence model, and storing the extracted TTP information as a list.

In some embodiments, generating the temporary playbook comprises determining whether all of the retrieved data sources exist in a data source list of the target network, and selecting, when all of the retrieved data sources exist in the data source list of the target network, a data component having a detection method field that matches a detection method of the extracted TTP information among a plurality of data components of the retrieved data source.

In some embodiments, the method further comprises updating, when there is a data source among the retrieved data sources that does not exist in the data source list of the target network, a data source of the extracted TTP information.

In some embodiments, determining whether rearrangement of data components included in the temporary playbook is needed comprises determining known order information or data component order information of another playbook as comparison target order information for data components of the temporary playbook, calculating similarity between data component order information of the temporary playbook and the comparison target order information, and determining, if the calculated similarity is less than a predetermined threshold, rearrangement of data components of the temporary playbook is needed.

In some embodiments, calculating the similarity comprises converting the data component order information of the temporary playbook and the comparison target order information into a graph, respectively, and calculating similarity between the converted graphs.

In some embodiments, the method further comprises determining, when the calculated similarity is greater than or equal to a predetermined threshold, that rearrangement of data components of the temporary playbook is not needed, storing, when it is determined that rearrangement of the data component is not needed, the temporary playbook as a final playbook.

According to another embodiments of the present disclosure, there is provided a computing apparatus. The apparatus comprises a processor, and a memory for storing instructions, wherein, the instructions, when executed by the processor, cause the processor to perform operations comprising, periodically collecting asset information and CTI (Cyber Threat Intelligence) information of a target network, extracting TTP (Tactics, Techniques, Procedure) information using the collected asset information and the collected CTI information, retrieving a data source of the extracted TTP information, generating a temporary playbook including a data component matching a detection method of the extracted TTP information among a plurality of data components of the retrieved data source, verifying validity of the temporary playbook based on data component order information of the temporary playbook and determining whether rearrangement of data components included in the temporary playbook is needed, and rearranging, when it is determined that rearrangement of the data components is needed, data components included in the temporary playbook according to an analysis result of the data component order information and storing it as a final playbook.

In some embodiments, extracting the TTP information using the collected asset information and the collected CTI information comprises determining whether the collected asset information or the collected CTI information has been updated, retrieving, when the collected asset information has been updated, intermediate TTP information related to a data source of the updated asset information, and retrieving CTI information including the intermediate TTP information related to the data source, retrieving, when the collected CTI information has been updated, the updated CTI information, and extracting the TTP information from the retrieved CTI information.

In some embodiments, extracting the TTP information from the retrieved CTI information comprises determining whether the retrieved CTI information is structured or unstructured, extracting, when the retrieved CTI information is structured, the TTP information using a rule-based parser, extracting, when the retrieved CTI information is unstructured, the TTP information using an artificial intelligence model, and storing the extracted TTP information as a list.

In some embodiments, generating the temporary playbook comprises determining whether all of the retrieved data sources exist in a data source list of the target network, and selecting, when all of the retrieved data sources exist in the data source list of the target network, a data component having a detection method field that matches a detection method of the extracted TTP information among a plurality of data components of the retrieved data source.

In some embodiments, the instructions, when executed by the processor, further cause the processor to perform operations comprising, updating, when there is a data source among the retrieved data sources that does not exist in the data source list of the target network, a data source of the extracted TTP information.

In some embodiments, determining whether rearrangement of data components included in the temporary playbook is needed comprises determining known order information or data component order information of another playbook as comparison target order information for data components of the temporary playbook, calculating similarity between data component order information of the temporary playbook and the comparison target order information, and determining, if the calculated similarity is less than a predetermined threshold, rearrangement of data components of the temporary playbook is needed.

In some embodiments, calculating the similarity comprises converting the data component order information of the temporary playbook and the comparison target order information into a graph, respectively, and calculating similarity between the converted graphs.

In some embodiments, the instructions, when executed by the processor, further cause the processor to perform operations comprising, determining, when the calculated similarity is greater than or equal to a predetermined threshold, that rearrangement of data components of the temporary playbook is not needed, storing, when it is determined that rearrangement of the data component is not needed, the temporary playbook as a final playbook.

According to another embodiments of the present disclosure, there is provided a apparatus for generating a playbook. The apparatus comprises an information collection module for periodically collecting asset information and CTI (Cyber Threat Intelligence) information of a target network and extracting TTP (Tactics, Techniques, Procedure) information using the collected asset information and the collected CTI information, a data matching module for retrieving a data source of the extracted TTP information and generating a temporary playbook including a data component matching a detection method of the extracted TTP information among a plurality of data components of the retrieved data source, and a data rearrangement module for verifying validity of the temporary playbook based on data component order information of the temporary playbook, determining whether rearrangement of data components included in the temporary playbook is needed, rearranging, when it is determined that rearrangement of the data components is needed, data components included in the temporary playbook according to an analysis result of the data component order information and storing it as a final playbook.

In some embodiments, the playbook generation apparatus communicates with an administrator terminal and transmits the final playbook to the administrator terminal.

In some embodiments, the asset information includes operating system installed on the target network, software name, software version, and open port information.

In some embodiments, the data rearrangement module further updates the final playbook by rearranging data components of the final playbook.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
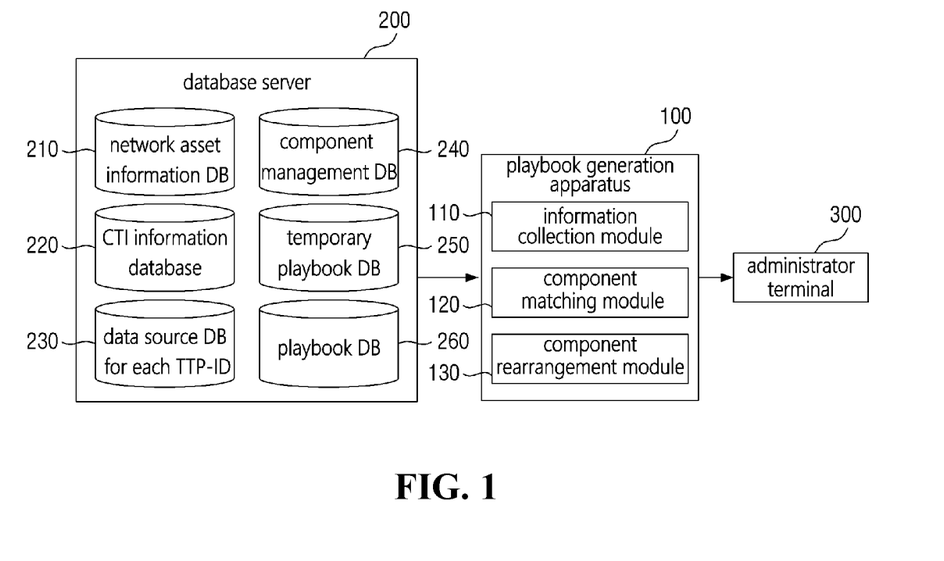
FIG. 1 is a block diagram showing an exemplary configuration of an automatic playbook generation system according to an embodiment of the present disclosure.

FIG. 1 is a block diagram showing an exemplary configuration of an automatic playbook generation system according to an embodiment of the present disclosure. Referring to FIG. 1, the playbook automatic generation system may comprise a playbook generation apparatus 100, a database server 200, and an administrator terminal 300. The playbook generation apparatus 100 extracts TTP information based on network asset information and CTI (Cyber Threat Intelligence) information stored in the database server 200 to analyze security events and automatically generate a playbook to respond to threats. The generated playbook can be provided to the administrator terminal 300 of the security control center to respond to potential threats.

The playbook generation apparatus 100 may collect network asset information and CTI information from the database server 200, extract TTP information from the collected information, generate a playbook including a data source component that matches the detection method of the extracted TTP information, verify the effectiveness of the playbook by analyzing the order information of the components, and then rearrange the components. Meanwhile, the components (modules) of the playbook generation apparatus 100 shown in FIG. 1 represent functionally distinct functional components, and at least one component (module) can also be implemented as being integrated with each other in the actual physical environment.

The information collection module 110 may periodically collect asset information of the protection target network from the network asset information DB 210 of the database server 200 (e.g., role of the protection target network system, operating system installed and operating, software name, software version, open port information, etc.), and periodically collect externally collected CTI information from the CTI information DB 220. The information collection module 110 may extract TTP information using the periodically collected asset information or CTI information. For example, extraction of TTP information may be performed through extraction of the ID assigned to the TTP.

Specifically, the information collection module 110 may determine whether the collected asset information or CTI information has been updated. First, when the asset information has been updated, the information collection module 110 may retrieve TTP information related to the data source of the updated asset information in a data source DB 230 for each TTP-ID of the database server 200, and retrieve CTI information including the retrieved TTP information in a CTI information DB 220 to extract TTP information from the finally retrieved CTI information. Meanwhile, when the CTI information has been updated, the information collection module 110 may directly retrieve the updated CTI information in the CTI information DB 220 and extract TTP information from the retrieved CTI information. Here, the method of extracting TTP information may vary depending on the type of CTI information. For example, if the CTI information is structured, TTP information can be extracted using a rule-based parser, and if the CTI information is unstructured, the TTP information can be extracted using a series of artificial intelligence models. The TTP information extracted in this way may be provided to the component matching module 120.

The component matching module 120 may retrieve the data source of the TTP information extracted from the data source DB 230 for each TTP-ID of the database server 200 and update it if there is a change in each field of the data source. Next, the component matching module 120 may check whether all of the retrieved data sources exist in the data source list of the protection target network. If it is confirmed that all exist, the component matching module 120 may refer to the component management DB 240 and select a data component having a detection method field that matches the detection method field of the extracted TTP information among the plurality of data components of the retrieved data source. The component matching module 120 may automatically generate a temporary playbook composed of the matched data components and store it in the temporary playbook DB 250. Additionally, the component matching module 120 may provide an automatically generated temporary playbook to the component rearrangement module 130.

The component rearrangement module 130 may verify the validity of the temporary playbook based on data component order information of the automatically generated temporary playbook and determine whether rearrangement of the data component is needed. In addition, if it is determined that rearrangement is needed, the data components of the temporary playbook can be rearranged to effectively respond to the threat. The data component order information may be information indicating the order of data components that should be placed on a playbook in order to effectively respond to security threats.

First, in order to determine whether to rearrange data components, the data component order information of the temporary playbook may be compared with existing known order information (for example, order information stored in the component DB 240) or order information included in another playbook selected by an expert. For example, data component order information and order information to be compared may be converted into a graph, and similarity between the converted graphs may be calculated. At this time, if the calculated similarity is greater than or equal to a predetermined threshold, it may be determined that rearrangement is not needed, and if it is less than the threshold, it may be determined that rearrangement is needed.

If it is determined that rearrangement is needed, the component rearrangement module 130 may rearrange the data components of the temporary playbook according to the analysis result of the data component order information to generate a final playbook and store it in the playbook DB 260. In other words, the component rearrangement module 130 may rearrange data components of a temporary playbook according to known order information, or may rearrange data components of a temporary playbook by referring to data component order information of another playbook. Meanwhile, if it is determined that rearrangement is not needed, the component rearrangement module 130 may store the temporary playbook as the final playbook in the playbook DB 260. The final playbook generated in this way may be transmitted to the administrator terminal 300. The operations of the component rearrangement module 130 described above may be performed on all temporary playbooks stored in the temporary playbook DB 250. Additionally, the above-described operations may be performed to update the final playbook stored in the playbook DB 260.

The above-described playbook generation apparatus 100 may be implemented on at least one computing apparatus. For example, all of the functions of the playbook generation apparatus 100 may be implemented in one computing apparatus, or some functions of the playbook generation apparatus 100 may be implemented in the first computing apparatus and remaining functions may be implemented in the second computing apparatus. Alternatively, specific functions of the playbook generation apparatus 100 may be implemented in a plurality of computing apparatuses. The computing apparatus may include any apparatus equipped with a computing function, and an embodiment in which the playbook generation apparatus 100 is implemented as a computing apparatus will be described in more detail with reference to FIG. 10.

The database server 200 may include a plurality of databases necessary to perform the operations of the playbook generation apparatus 100 described above. For example, a plurality of databases included in the database server 200 may include information obtained as a result of analyzing a framework related to a cyber attack. In FIG. 1, it is shown that the databases included in the database server 200 include a network asset information DB 210, a CTI information DB 220, a data source DB 230 for each TTP-ID, a component management DB 240, and a temporary playbook DB 250, and a playbook DB 260, but the present disclosure is not limited thereto, and the database server 200 may further include databases for other purposes, and the databases shown as being separated may be implemented in an integrated form. Additionally, the databases shown in FIG. 1 may exist on different servers.

The administrator terminal 300 may be a computing apparatus used by the security administrator to receive the playbook generated by the playbook generation apparatus 100. For example, the administrator terminal 300 may include a smartphone, a desktop, a laptop, etc., but the present disclosure is not limited thereto, and the administrator terminal 300 may be implemented as any computing apparatus equipped with computing means and communication means.

Additionally, the components shown in FIG. 1 can communicate over a network. For example, networks can be implemented as all types of wired/wireless networks such as Local Area Network (LAN), Wide Area Network (WAN), mobile radio communication network, Wibro (Wireless Broadband Internet), etc.

Figure 2:
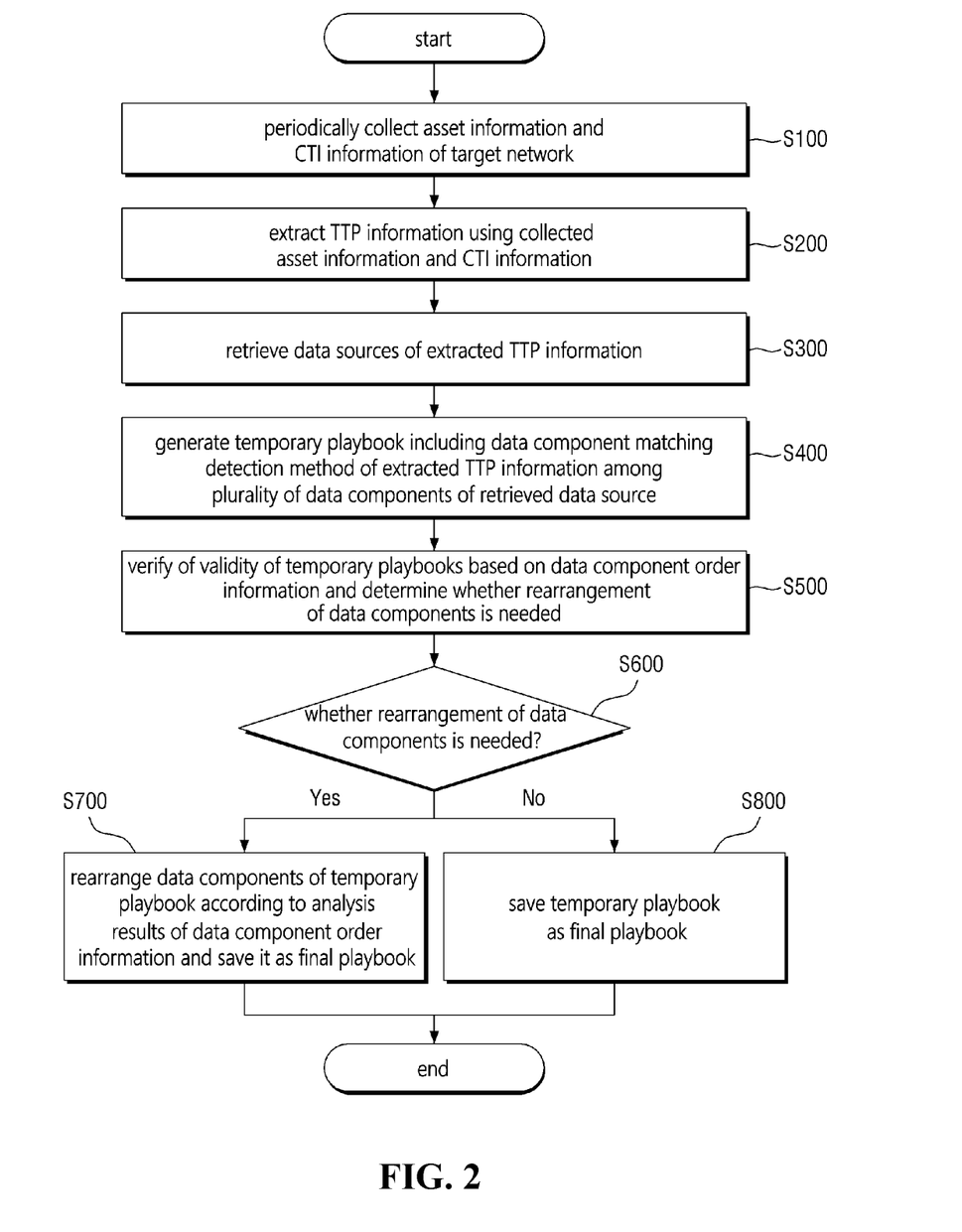
FIG. 2 is a flowchart illustrating a method for automatically generating a playbook according to an embodiment of the present disclosure.

FIG. 2 is a flowchart illustrating a method for automatically generating a playbook according to an embodiment of the present disclosure. For reference, FIG. 2 shows steps/operations performed in the playbook generation apparatus 100 of FIG. 1. Accordingly, in the following descriptions, when the subject of a specific step/operation is omitted, it may be understood that the step/operation is performed in the playbook generation apparatus 100 of FIG. 1. Hereinafter, the description will be made with reference to FIG. 1 along with FIG. 2.

In step S100, the information collection module 110 of the playbook generation apparatus 100 may periodically collect asset information of the target network from the network asset information DB 210 and collect CTI information from the CTI information DB 220. Then, in step S200, the information collection module 110 may extract TTP information using the collected asset information and CTI information. For example, extraction of the TTP information may be performed through extraction of the TTP ID. Step S200 will be described with reference to FIG. 3.

Figure 3:
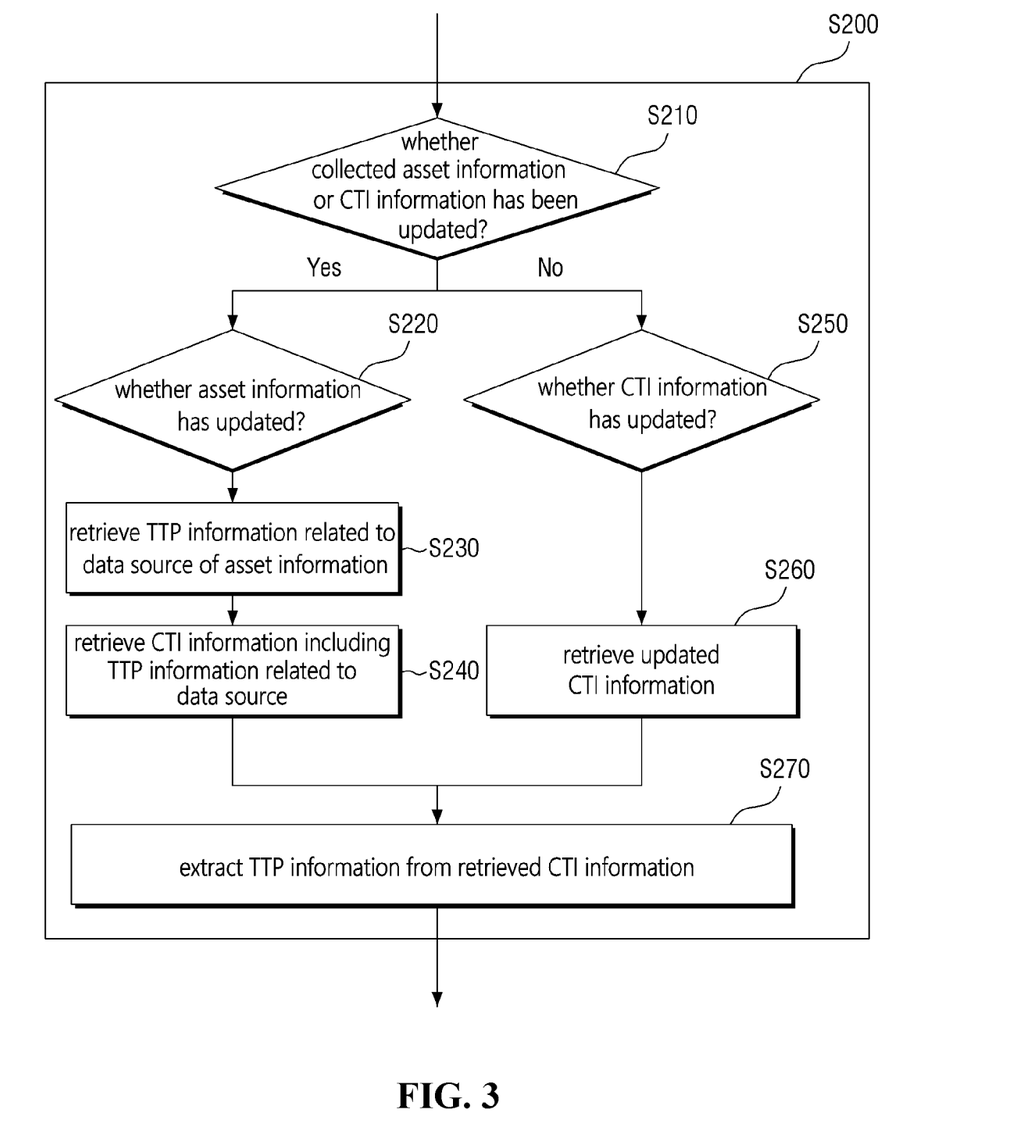
FIG. 3 is a flowchart specifically showing the steps of extracting TTP information in FIG. 2.

FIG. 3 is a flowchart specifically showing the step (S200) of extracting TTP information of FIG. 2. In step S210, it may be determined whether the periodically collected asset information or CTI information has been updated. If it is determined to be updated (YES), the operation of the information collection module 110 varies depending on whether the asset information or CTI information has been updated. First, in step S220, if it is determined that the asset information has been updated, in step S230, TTP information related to the data source of the asset information is retrieved from the data source DB 230 for each TTP-ID, and in step S240, CTI information including TTP information related to the data source is retrieved from the CTI information DB 220. To distinguish it from the TTP information to be extracted, the TTP information in steps S230 and S240 will be referred to as intermediate TTP information.

On the other hand, if it is determined that the CTI information has been updated in step S250, the updated CTI information is directly retrieved in step S260. And in step S270, TTP information may be extracted from the retrieved CTI information. At this time, the method of extracting TTP information varies depending on the type of CTI information in step S270, which will be described with reference to FIG. 4.

Figure 4:
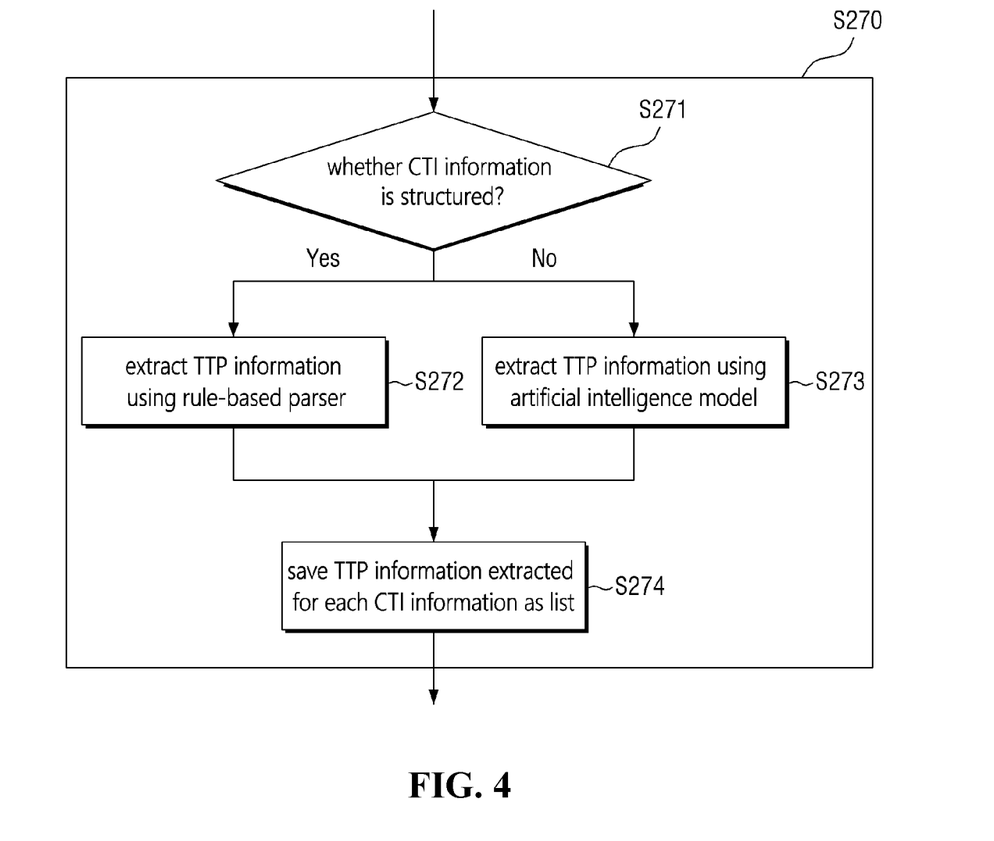
FIG. 4 is a flowchart specifically illustrating the steps of extracting TTP information from the retrieved CTI information of FIG. 3.

FIG. 4 is a flowchart specifically showing the step (S270) of extracting TTP information from the retrieved CTI information of FIG. 3. In step S271, it may be determined whether the retrieved CTI information is structured or unstructured. If the CTI information is determined to be structured (YES), in step S272, the TTP information may be extracted using a rule-based parser. On the other hand, if the CTI information is determined to be unstructured (NO), in step S273, the TTP information may be extracted using an artificial intelligence model. Then, in step S274, TTP information extracted for each CTI information may be stored as a list. Embodiments, in which TTP information is extracted when CTI information is structured and unstructured, will be described with reference to FIGS. 5 and 6, respectively.

Figure 5:
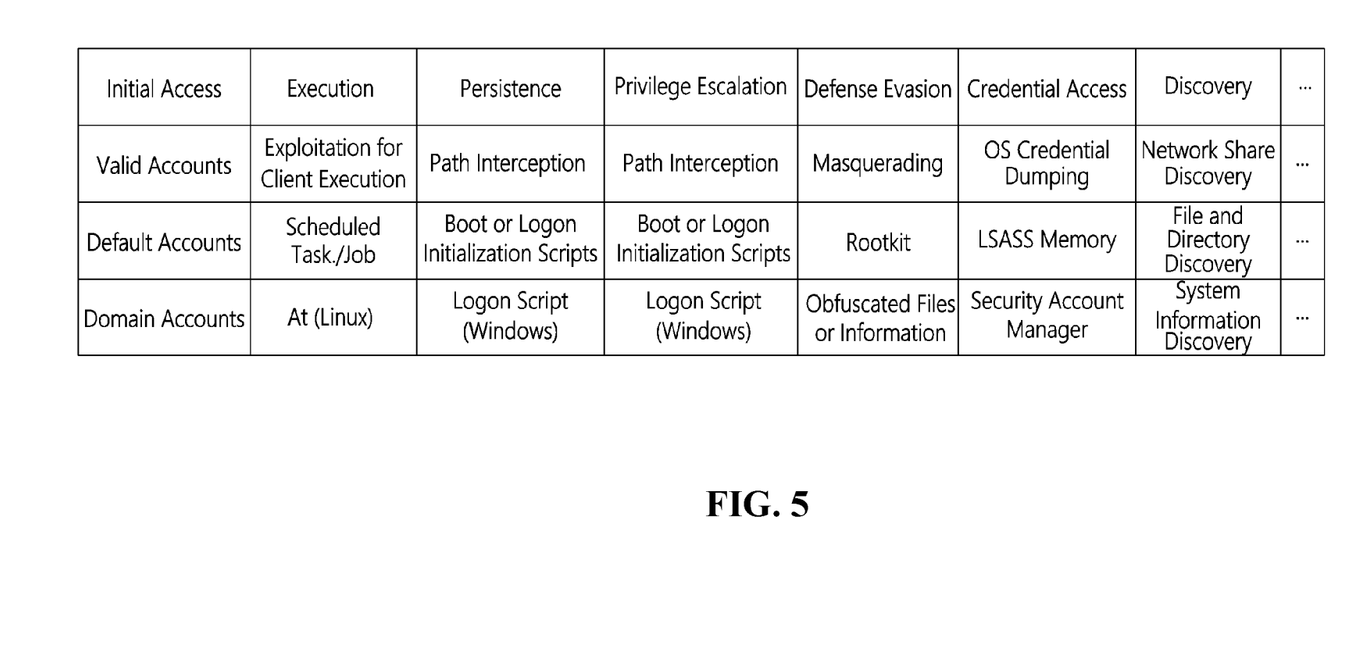
FIG. 5 shows an embodiment, in which TTP information is extracted when CTI information is structured.

FIG. 5 shows an embodiment, in which TTP information is extracted when CTI information is structured. For example, if the CTI information is structured, it means that the data structure of the CTI information is defined in a standardized format such as JSON or STIX/TAXII format. In this case, when the CTI information is structured, a rule-based parser can be applied to the CTI information to extract one or more of the TTP information listed in the matrix shown in FIG. 5. The matrix shown in FIG. 5 visualizes the concepts and relationships between Tactic, which represents actions according to the attacker's attack goal, and Technique, which represents the method to achieve the tactic. The first row, from Initial Access to Discovery, corresponds to Tactic. And the components from the second to fourth rows correspond to Technique. When TTP information is extracted through the operation of a rule-based parser, the detailed technology used in the actual attack can be identified with respect to the extracted TTP information. The matrix shown in FIG. 5 is an example and may appear differently depending on the type of the administrator terminal (300 in FIG. 1) (e.g., an enterprise terminal, a mobile terminal, an industrial control system terminal, etc.).

Figure 6:
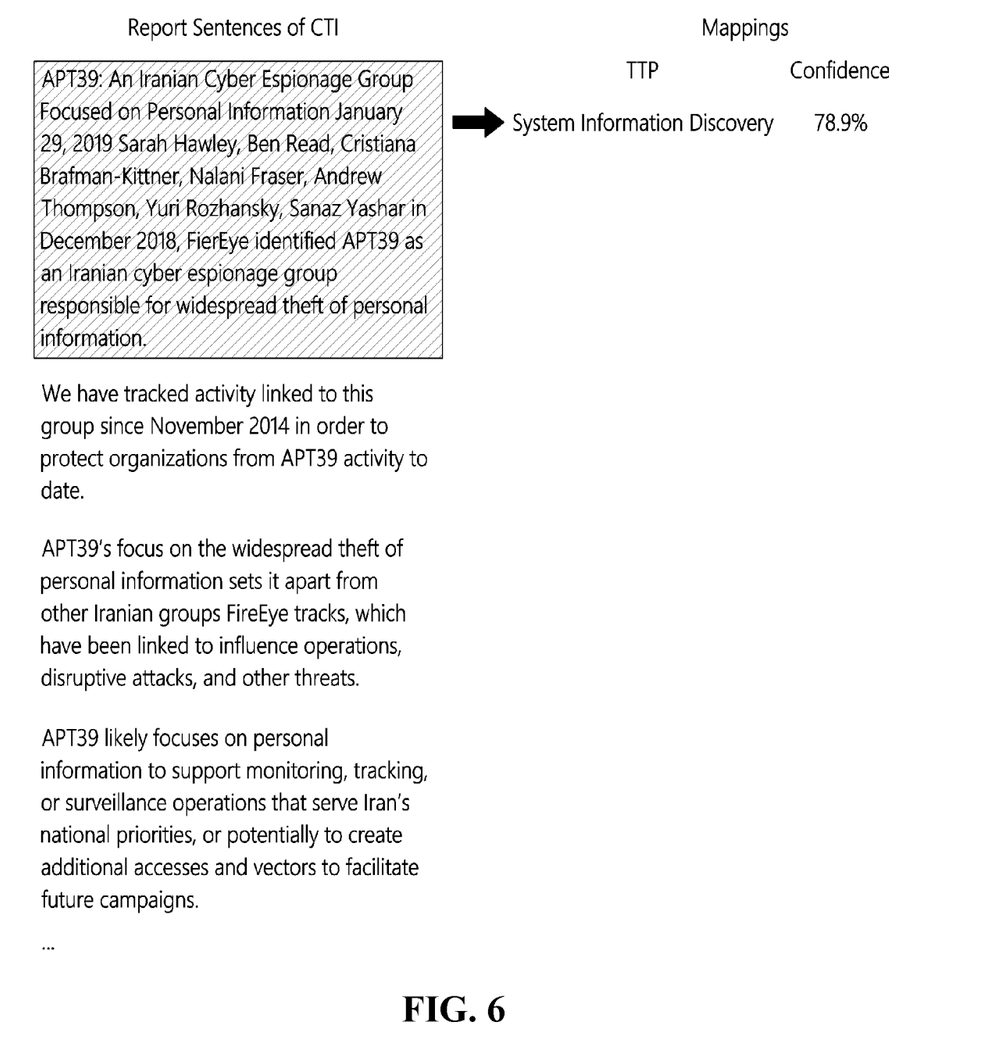
FIG. 6 shows an embodiment, in which TTP information is extracted when CTI information is unstructured.

FIG. 6 shows an embodiment, in which TTP information is extracted when CTI information is unstructured. A case where the CTI information is unstructured refers to a case where the CTI information is described in a sentence, for example, as shown in FIG. 6. In this case, a series of artificial intelligence models may be applied to sentences containing CTI information to predict the mapped TTP information, and the accuracy of the prediction may be output together. In the case of the sentence shown in FIG. 6 (shaded in gray), as a result of applying the artificial intelligence model, it is predicted to be mapped to TTP information called "System Information Discovery," and the accuracy is shown to be 78.9%. Additionally, in some cases, a plurality of TTP information expected to be mapped and respective prediction accuracies may be output.

Returning to FIG. 2, in step S300, the component matching module 120 of the playbook generation apparatus 100 may retrieve the data source of the extracted TTP information in the data source DB 230 for each TTP-ID, and update it if there are changes in each field in the source. Then, in step S400, the component matching module 120 may generate a temporary playbook including a data component that matches the detection method of the extracted TTP information among the plurality of data components of the retrieved data source.

Specifically, the TTP information includes an ID and a name as well as a detection method as one of a plurality of fields, and each data component of the data source also includes a detection method as one of a plurality of fields, and the component matching module 120 may select a data component having a detection method field that matches the detection method of the TTP information, and automatically generate a temporary playbook composed of the selected data component. The generated temporary playbook may be stored in the temporary playbook DB 250. Step S400 will be described with reference to FIG. 7.

Figure 7:
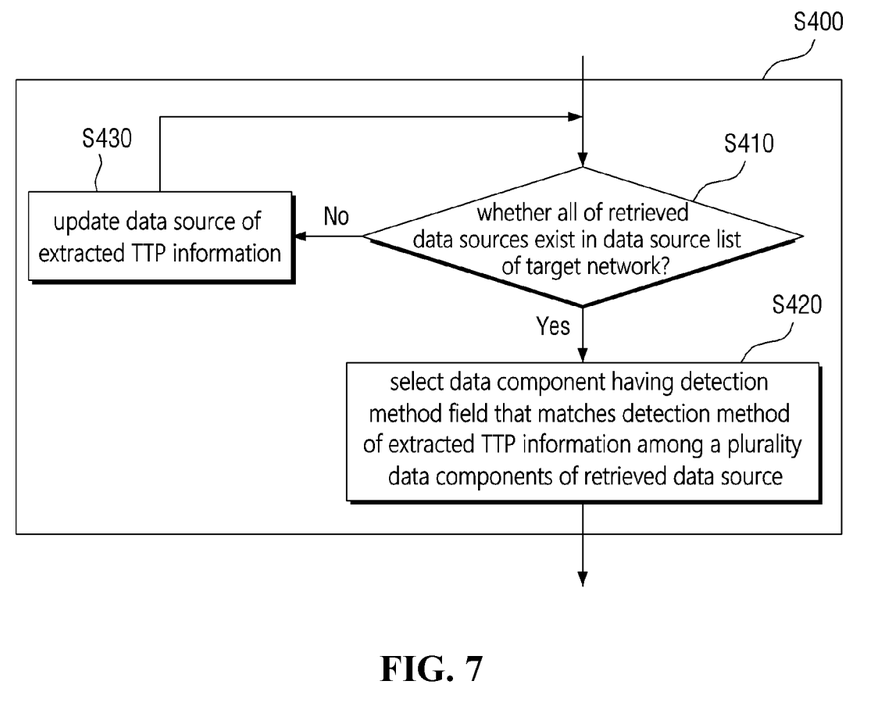
FIG. 7 is a flowchart specifically illustrating the steps of generating the temporary playbook of FIG. 2.

FIG. 7 is a flowchart specifically showing the step (S400) of generating the temporary playbook of FIG. 2. In step S410, it is determined whether all of the data sources retrieved in the data source DB 230 for each TTP-ID exist in the data source list of the protection target network. If it is determined that all of the retrieved data source exist in the data source list of the target network (YES), in step S420, a data component having a detection method field matching the detection method of the extracted TTP information among the plurality of data components of the retrieved data source may be selected. If there is a data source among the retrieved data sources that does not exist in the data source list of the protection target network (NO), the data source of the extracted TTP information may be updated in step S430, and step S410 may be performed again.

Returning to FIG. 2, in step S500, the component rearrangement module 130 of the playbook generation apparatus 100 may verify the validity of the temporary playbook based on the data component order information and determine whether rearrangement of the data component order is needed. For example, to determine whether rearrangement is needed, the data component order information of a temporary playbook may be compared with already known order information or with order information of another playbook selected by an expert. Step S500 will be described with reference to FIG. 8.

Figure 8:
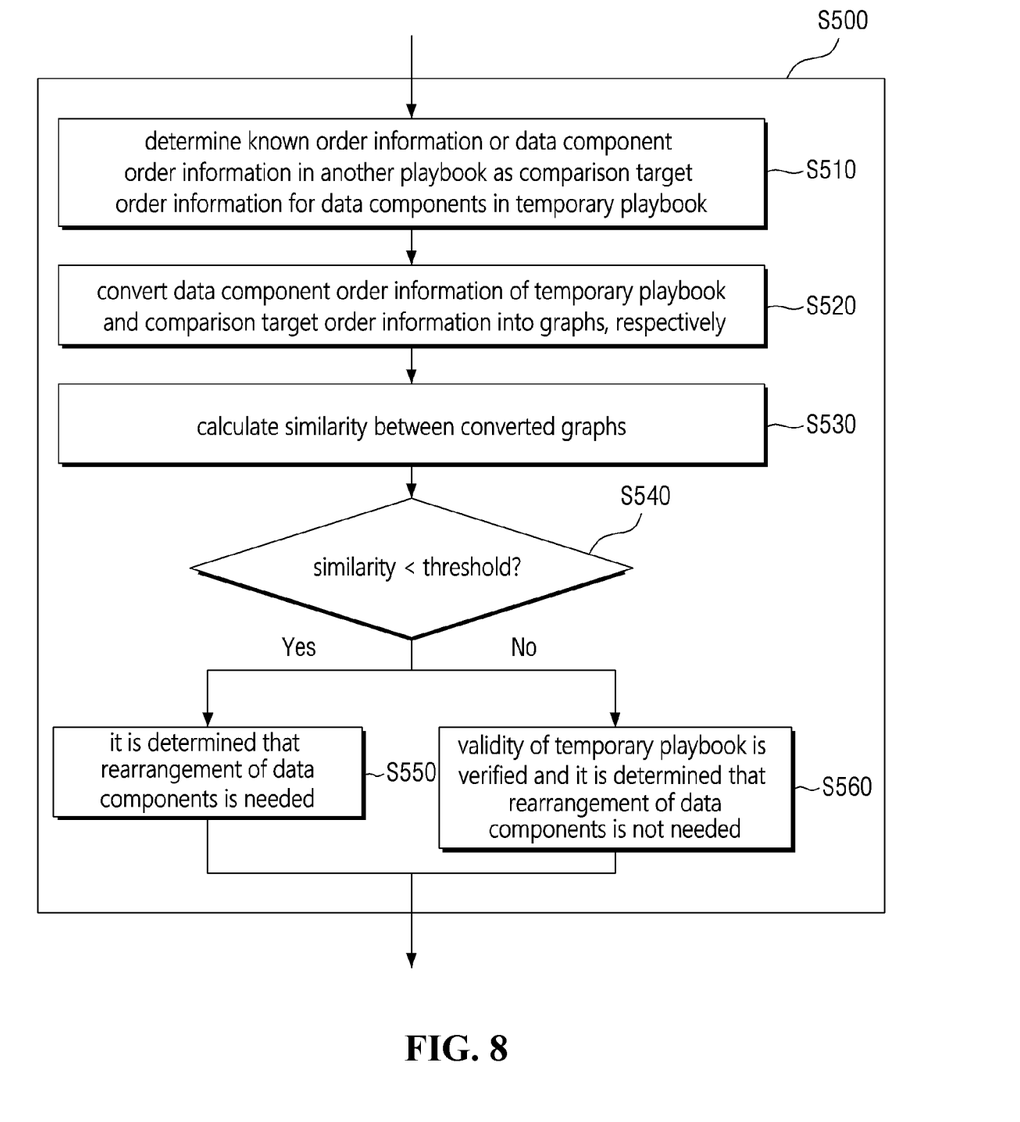
FIG. 8 is a flowchart specifically illustrating the steps of determining whether rearrangement of the data component of FIG. 2 is needed.

FIG. 8 is a flowchart specifically showing the step (S500) of determining whether rearrangement of the data component of FIG. 2 is needed. In step S510, known order information or data component order information of another playbook may be determined as a comparison target order information for data components of the temporary playbook. In step S520, the data component order information of the temporary playbook and the comparison target order information may be converted into a graph, respectively, and in step S530, the similarity between the two graphs may be calculated.

In step S540, it may be determined whether the calculated similarity is less than a predetermined threshold. If the similarity is less than the threshold (YES), in step S550, it may be determined that rearrangement of the data component is needed. On the other hand, if the similarity is greater than or equal to the threshold (NO), in step S560, the validity of the temporary playbook may be verified and it may be determined that rearrangement of the data component is not needed.

Returning to FIG. 2, in step S600, the component rearrangement module 130 may determine whether to rearrange the data component determined in step S500, and if it is determined that rearrangement is needed (YES), in step S700, the data components of the temporary playbook may be rearranged according to the analysis result of the data component order information, and saved as the final playbook. On the other hand, if it is determined that rearrangement is not needed (NO), the temporary playbook may be saved as the final playbook in step S800. The final playbook may be stored in the playbook DB 260 and transmitted to the administrator terminal 300.

Figure 9:
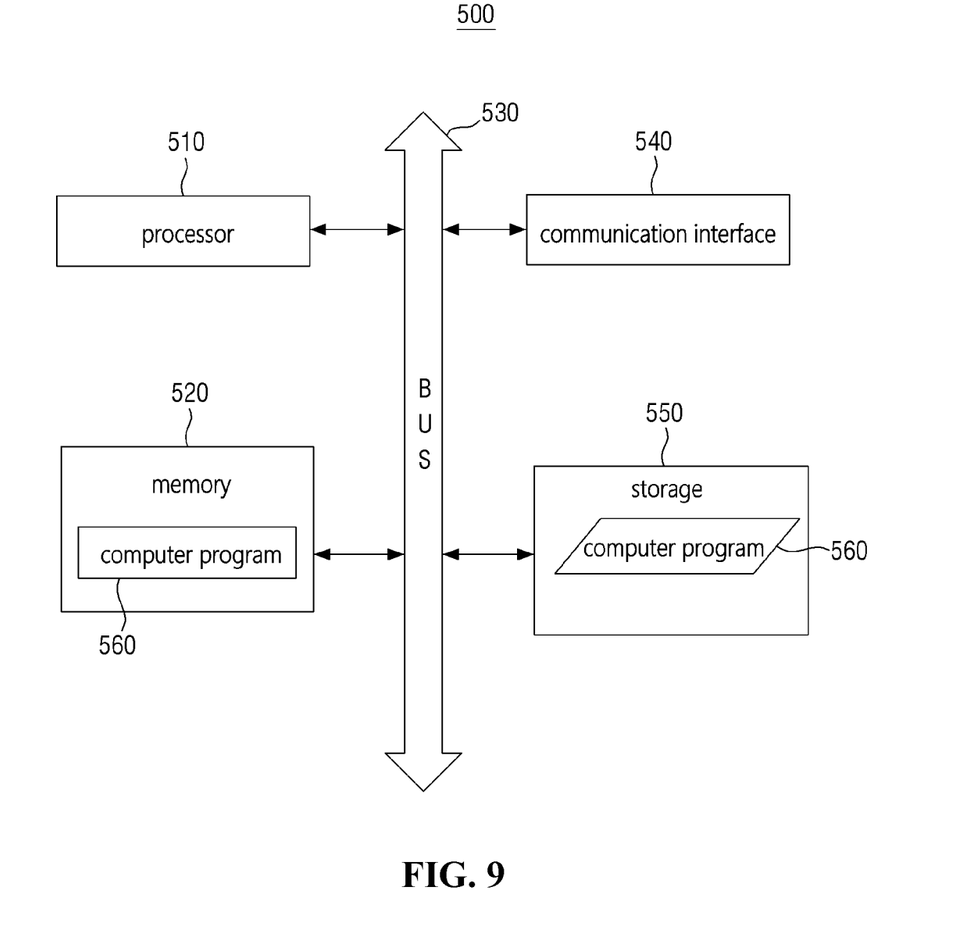
FIG. 9 is a block diagram showing the hardware configuration of a computing apparatus for automatically generating a playbook according to an embodiment of the present disclosure.

FIG. 9 is an exemplary diagram of a hardware configuration illustrating a computing device 500.

As illustrated in FIG. 9, the computing device 500 may include one or more processors 510, a bus 530, a communication interface 540, a memory 520 configured to load a computer program 560 performed by the processor 510, and a storage 550 configured to store the computer program 560.

However, only components related to embodiments of the present disclosure are illustrated in FIG. 9. Therefore, it may be seen by one of ordinary skill in the art to which the present disclosure pertains that other general-purpose components may be further included in addition to the components illustrated in FIG. 9. In other words, the computing device 500 may further include various components in addition to the components illustrated in FIG. 9. In addition, in some cases, the computing device 500 may be configured in the form in which some of the components illustrated in FIG. 9 are omitted. Hereinafter, each component of the computing device 500 will be described.

The processor 510 may control the overall operations of each component of the computing device 500. The processor 510 may include at least one of a central processing unit (CPU), a micro-processor unit (MPU), a micro-controller unit (MCU), a graphical processing unit (GPU), and any type of processor well-known in the technical field of the present disclosure. Furthermore, the processor 510 may perform an arithmetic operation on at least one application or program for executing operations/methods according to the embodiments of the present disclosure. The computing device 500 may include one or more processors.

Next, the memory 520 may store different kinds of data, instructions, and/or information. The memory 520 may load the computer program 560 from the storage 550 to execute the operations/methods according to the embodiments of the present disclosure. The memory 520 may be implemented as a volatile memory such as a RAM, but the technical scope of the present disclosure is not limited thereto.

Next, the bus 530 may provide a communication function between components of the computing device 500. The bus 530 may be implemented as various types of buses such as an address bus, a data bus, and a control bus.

Next, the communication interface 540 may support wired/wireless Internet communication of the computing device 500. In addition, the communication interface 540 may support a variety of communication ways other than Internet communication. To this end, the communication interface 540 may include a communication module well-known in the technical field of the present disclosure. In some cases, the communication interface 540 may be omitted.

Next, the storage 550 may non-temporarily store one or more computer programs 560. The storage 550 may include non-volatile memories such as a read-only memory (ROM), an erasable programmable ROM (EPROM), an electrically erasable programmable ROM (EEPROM) and a flash memory, a hard disk, a removable disk, or any type of computer-readable recording medium well-known in the technical field to which the present disclosure belongs.

Next, the computer program 560 may include one or more instructions that cause the processor 510 to perform the operations/methods according to various embodiments of the present disclosure when loaded into the memory 520. In other words, the processor 510 may execute one or more instructions loaded in the memory 520 to perform the operations/methods according to various embodiments of the present disclosure.

For example, the computer program 560 may include one or more instructions for periodically collecting asset information and CTI (Cyber Threat Intelligence) information of a target network, extracting TTP (Tactics, Techniques, Procedure) information using the collected asset information and the collected CTI information, retrieving a data source of the extracted TTP information, generating a temporary playbook including a data component matching a detection method of the extracted TTP information among a plurality of data components of the retrieved data source, verifying validity of the temporary playbook based on data component order information of the temporary playbook and determining whether rearrangement of data components included in the temporary playbook is needed, and rearranging, when it is determined that rearrangement of the data components is needed, data components included in the temporary playbook according to an analysis result of the data component order information and storing it as a final playbook.

According to an embodiment of the present disclosure, a playbook can be automatically generated through the collection and analysis of external CTI information and internal network asset information, and the order of data components constituting the playbook can also be rearranged as needed. This can reduce the consumption of human resources required for playbook management tasks, such as generating playbooks, to respond to new threats. In particular, as it becomes possible to respond to new threats only by continuously updating external CTI information and internal network asset information, security controllers can focus more on security events that require direct analysis.

Until now, various embodiments of the present disclosure and effects according to the embodiments have been mentioned with reference to FIGS. 1 to 9. The effects of the technical idea of the present disclosure are not restricted to those set forth herein, and other unmentioned technical effects will be clearly understood by one of ordinary skill in the art to which the present disclosure pertains by referencing the detailed description of the present disclosure given below.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation. The scope of protection of this disclosure should be interpreted in accordance with the claims below, and all technical ideas within the equivalent scope should be interpreted as being included in the scope of rights of this disclosure.

What is claimed is:

1. A method for automatically generating a playbook performed by a computing apparatus comprising:
   periodically collecting asset information and CTI (Cyber Threat Intelligence) information of a target network;
   extracting TTP (Tactics, Techniques, Procedure) information using the collected asset information and the collected CTI information;
   retrieving a data source of the extracted TTP information;
   generating a temporary playbook including a data component matching a detection method of the extracted TTP information among a plurality of data components of the retrieved data source;

verifying validity of the temporary playbook based on data component order information of the temporary playbook;

determining whether rearrangement of data components included in the temporary playbook is needed; and when it is determined that rearrangement of the data components is needed:

rearranging data components included in the temporary playbook according to an analysis result of the data component order information and storing the rearranged temporary playbook as a final playbook, wherein determining whether rearrangement of data components included in the temporary playbook is needed comprises automatically:

determining known order information or data component order information of another playbook as comparison target order information for data components of the temporary playbook;

calculating similarity between data component order information of the temporary playbook and the comparison target order information; and determining, if the calculated similarity is less than a predetermined threshold, rearrangement of data components of the temporary playbook is needed, and wherein calculating the similarity comprises:

converting the data component order information of the temporary playbook and the comparison target order information into a graph, respectively; and calculating similarity between the converted graphs.

2. The method of claim 1, wherein extracting the TTP information using the collected asset information and the collected CTI information comprises, determining whether the collected asset information or the collected CTI information has been updated;

retrieving, when the collected asset information has been updated, intermediate TTP information related to a data source of the updated asset information, and retrieving CTI information including the intermediate TTP information related to the data source;

retrieving, when the collected CTI information has been updated, the updated CTI information; and extracting the TTP information from the retrieved CTI information.

3. The method of claim 2, wherein extracting the TTP information from the retrieved CTI information comprises, determining whether the retrieved CTI information is structured or unstructured;

extracting, when the retrieved CTI information is structured, the TTP information using a rule-based parser;

extracting, when the retrieved CTI information is unstructured, the TTP information using an artificial intelligence model; and storing the extracted TTP information as a list.

4. The method of claim 1, wherein generating the temporary playbook comprises, determining whether all of the retrieved data sources exist in a data source list of the target network; and selecting, when all of the retrieved data sources exist in the data source list of the target network, a data component having a detection method field that matches a detection method of the extracted TTP information among a plurality of data components of the retrieved data source.

5. The method of claim 4 further comprises, updating, when there is a data source among the retrieved data sources that does not exist in the data source list of the target network, a data source of the extracted TTP information.

6. The method of claim 1 further comprises, determining, when the calculated similarity is greater than or equal to a predetermined threshold, that rearrangement of data components of the temporary playbook is not needed;

storing, when it is determined that rearrangement of the data component is not needed, the rearranged temporary playbook as a final playbook.

7. A computing apparatus comprising:

a processor; and a memory for storing instructions, wherein, the instructions, when executed by the processor, cause the processor to perform operations comprising:

periodically collecting asset information and CTI (Cyber Threat Intelligence) information of a target network;

extracting TTP (Tactics, Techniques, Procedure) information using the collected asset information and the collected CTI information;

retrieving a data source of the extracted TTP information;

generating a temporary playbook including a data component matching a detection method of the extracted TTP information among a plurality of data components of the retrieved data source;

verifying validity of the temporary playbook based on data component order information of the temporary playbook;

determining whether rearrangement of data components included in the temporary playbook is needed; and when it is determined that rearrangement of the data components is needed:

rearrange data components included in the temporary playbook according to an analysis result of the data component order information and store the rearranged temporary playbook as a final playbook, wherein determining whether rearrangement of data components included in the temporary playbook is needed comprises automatically:

determining known order information or data component order information of another playbook as comparison target order information for data components of the temporary playbook;

calculating similarity between data component order information of the temporary playbook and the comparison target order information; and determining, if the calculated similarity is less than a predetermined threshold, rearrangement of data components of the temporary playbook is needed, and wherein calculating the similarity comprises:

converting the data component order information of the temporary playbook and the comparison target order information into a graph, respectively; and calculating similarity between the converted graphs.

8. The computing apparatus of claim 7, wherein extracting the TTP information using the collected asset information and the collected CTI information comprises, determining whether the collected asset information or the collected CTI information has been updated;

retrieving, when the collected asset information has been updated, intermediate TTP information related to a data source of the updated asset information, and retrieving CTI information including the intermediate TTP information related to the data source;

retrieving, when the collected CTI information has been updated, the updated CTI information; and extracting the TTP information from the retrieved CTI information.

9. The computing apparatus of claim 8, wherein extracting the TTP information from the retrieved CTI information comprises, determining whether the retrieved CTI information is structured or unstructured;

extracting, when the retrieved CTI information is structured, the TTP information using a rule-based parser;

extracting, when the retrieved CTI information is unstructured, the TTP information using an artificial intelligence model; and storing the extracted TTP information as a list.

10. The computing apparatus of claim 7, wherein generating the temporary playbook comprises, determining whether all of the retrieved data sources exist in a data source list of the target network; and selecting, when all of the retrieved data sources exist in the data source list of the target network, a data component having a detection method field that matches a detection method of the extracted TTP information among a plurality of data components of the retrieved data source.

11. The computing apparatus of claim 10, wherein the operations further comprise, updating, when there is a data source among the retrieved data sources that does not exist in the data source list of the target network, a data source of the extracted TTP information.

12. The computing apparatus of claim 7, wherein the operations further comprise, determining, when the calculated similarity is greater than or equal to a predetermined threshold, that rearrangement of data components of the temporary playbook is not needed;

storing, when it is determined that rearrangement of the data component is not needed, the temporary playbook as a final playbook.

13. An apparatus for generating a playbook comprising:
a memory; and
a processor configured to:
periodically collect asset information and CTI (Cyber Threat Intelligence) information of a target network and extracting TTP (Tactics, Techniques, Procedure) information using the collected asset information and the collected CTI information;

retrieve a data source of the extracted TTP information and generate a temporary playbook including a data component matching a detection method of the extracted TTP information among a plurality of data components of the retrieved data source;

verify validity of the temporary playbook based on data component order information of the temporary playbook;

determine whether rearrangement of data components included in the temporary playbook is needed; and when it is determined that rearrangement of the data components is needed:

rearrange data components included in the temporary playbook according to an analysis result of the data component order information and store the rearranged temporary playbook as a final playbook, wherein to determine whether rearrangement of data components included in the temporary playbook is needed comprises automatically:

determining known order information or data component order information of another playbook as comparison target order information for data components of the temporary playbook;

calculating similarity between data component order information of the temporary playbook and the comparison target order information; and determining, if the calculated similarity is less than a predetermined threshold, rearrangement of data components of the temporary playbook is needed, and wherein calculating the similarity comprises:

converting the data component order information of the temporary playbook and the comparison target order information into a graph, respectively; and calculating similarity between the converted graphs.

14. The apparatus of claim 13, wherein the playbook generation apparatus communicates with an administrator terminal and transmits the final playbook to the administrator terminal.

15. The apparatus of claim 13, wherein the asset information includes operating system installed on the target network, software name, software version, and open port information.

16. The apparatus of claim 13, wherein the processor is further configured to update the final playbook by rearranging data components of the final playbook.

* * * * *